United States Patent [19]

Chan

[11] 4,411,798
[45] Oct. 25, 1983

[54] PROCESS FOR SEPARATING D₂O FROM H₂O USING SURFACTANT SYSTEMS

[75] Inventor: Keng S. Chan, South Euclid, Ohio

[73] Assignee: Standard Oil Company, Cleveland, Ohio

[21] Appl. No.: 309,948

[22] Filed: Oct. 9, 1981

Related U.S. Application Data

[63] Continuation of Ser. No. 153,490, May 27, 1980, abandoned.

[51] Int. Cl.³ .............................................. B01D 21/01
[52] U.S. Cl. .................................. 210/727; 210/639; 210/728; 423/580; 423/648 A
[58] Field of Search .............. 210/634, 642, 643, 702, 210/704, 705, 723, 727, 728, 749, 900, 639; 423/580, 648 A

[56] References Cited

U.S. PATENT DOCUMENTS 3,058,811 10/1962 Shay ..................................... 423/580
3,488,703 1/1970 Lee ...................................... 423/580
3,706,659 12/1972 Davis .................................. 210/642
4,146,473 3/1979 Edelmann et al. .................. 210/728

FOREIGN PATENT DOCUMENTS 2079707 11/1971 France ........................... 423/580 H Primary Examiner—Peter A. Hruskoci
Attorney, Agent, or Firm—D. L. Pawl; H. D. Knudsen; L. W. Evans

[57] ABSTRACT

This invention relates to a process for separating heavy water from solutions. An anionic surfactant system is added to a solution of deuterium oxide in water. The separating agent added to the solution will form a first phase containing a majority of the surfactant with an increased concentration of $D_2O$ and a second phase containing excess water with a decreased concentration of $D_2O$. The first stage is separated from the second stage, and the process is optionally repeated in a multi-stage or a continuous operation.

9 Claims, No Drawings

PROCESS FOR SEPARATING D₂O FROM H₂O USING SURFACTANT SYSTEMS

This is a continuation of application Ser. No. 153,490 filed May 27, 1980 now abandoned.

BACKGROUND OF THE INVENTION

1. Field of the Invention

This invention relates to a process for separating deuterium oxide ($D_2O$) from aqueous solutions. More particularly this invention relates to a method for increasing the concentration of $D_2O$ in the surfactant phase of a surfactant-water mixture and then separating this $D_2O$-rich phase from the remainder.

2. Description of the Prior Art

Several methods of isolating $D_2O$ from water are already known. Vacuum distillation of water is a relatively simple process but has a low separation factor and is very costly. Distillation of liquid hydrogen achieves very good separation with very low process energy requirements, but has disadvantages such as the cost of the required highly pure hydrogen and the problems of working with a liquefied gas. Chemical exchange methods are less expensive but these often require the use of catalysts or toxic and corrosive chemicals and yet do not achieve a high separation. A process taught by Shay in U.S. Pat. No. 3,058,811 uses a nonionic surface active agent having a polyalkylene glycol hydrophilic group to produce a dilute solution of the surface active agent with an enriched $D_2O$ concentration and a concentrated solution of the surface active agent in which the concentration of $D_2O$ has been lowered.

BRIEF SUMMARY OF THE INVENTION

According to this invention, $D_2O$ can be separated from solutions of $D_2O$ in $H_2O$ by:

(i) adding an anionic surfactant system to a solution of $D_2O$ in $H_2O$ in an amount capable of forming micelles;

(ii) providing a separating agent in the solution in an amount sufficient to form a first phase containing a majority of surfactant with an increased concentration of $D_2O$ and a second phase containing excess water with a decreased concentration of $D_2O$; and (iii) separating the first phase from the second phase.

The process can be repeated to achieve good separation at an extremely low cost in chemicals and energy.

DETAILED DESCRIPTION OF THE INVENTION

Process Components:

Deuterium oxide, or heavy water, is particularly useful as a neutron moderator in nuclear reactors. $D_2O$ occurs in nature at about 0.074 weight percent of total water. The solutions which may be utilized in this invention include those in which the concentration of $D_2O$ in $H_2O$ ranges from that found in natural waters to 99 weight percent or more. Preferably, the concentration of $D_2O$ by weight is from about that found in natural water to about 10%. The initial concentration of $D_2O$ is not critical to the invention.

The water used as a source of the $D_2O$ may also contain various other impurities such as inorganic salts or minor amounts of the debris and biota commonly found in natural waters. Preferably, the kind and/or amount of impurities or organisms present will be insufficient to adversely effect either the concentration of $D_2O$ or the formation of a surfactant phase. Otherwise, the source of the $D_2O$-containing water is not critical. For example, in one embodiment of the invention distilled water containing $D_2O$ is utilized. In other embodiments, tap water which has been pretreated to prevent the biological decomposition of the surfactant by the resident bacteria is used. In yet another embodiment, ordinary sea water is the source of $D_2O$.

The anionic surfactant systems utilized in this invention comprise anionic surfactants and, optionally, other modifiers. Anionic surfactants are those having a hydrophilic polar group that is negatively charged in aqueous solutions or dispersions. Examples of these polar groups are carboxylates, sulfonates, sulfates and phosphates.

Each molecule of anionic surfactant consists of two parts, a hydrophilic polar head and a hydrophobic hydrocarbon tail. As the surfactant concentration is increased in a water solution, hydrocarbon tails of the molecules associate and form micelles. The hydrocarbon groups are in the interior of the micelle, while the polar groups are in contact with the surrounding water and can be associated with electrolyte counter ions in the solution.

Examples of surfactants which may be used in this invention include Aerosol-OT ® (a sodium-di-2-ethylhexylsulfosuccinate manufactured by American Cyanamid Co.), sulfonates including alkylbenzene sulfonate and petroleum sulfonates, monoethanolamine salts of o-xylene sulfonic acid, and di- and tri-ethanolamine salts of ricinoleic acid. The petroleum sulfonates include gas-oil sulfonates commonly produced by sulfonation of a refinery hydrocarbon stream. Suitable commercially available petroleum sulfonates include Witco TRS-10-410 ® and TRS-10-80 ® (isomerically mixed surfactants) and the like. Preferred surfactants are the petroleum sulfonates because of their cost and availability. Most preferred are isomerically pure surfactants such as Aerosol-OT ® because of improved yields compared to sulfonates. Additional information on these surfactants can be found in trade literature and in Kirk-Othmer, *Encyclopedia of Chemical Technology*, 19, 2d Ed. under "Sulfonation and Sulfation" and "Surfactants."

As defined for this invention, an anionic surfactant system may consist of the surfactant alone. However, a modifier is preferably added to the surfactant to produce the desired characteristics of the surfactant in water. For example, it is preferred to add an alcohol such as normal butyl alcohol (nBA) as a modifier in the surfactant system to control the behavior of the micelle layer. The modifier can be mixed with the surfactant and the system is then introduced into the water. Alternatively, the modifier can be added to the surfactant in water in a separate step to form the surfactant system. Additional amounts of modifier surfactant can be added later to replenish any amount lost from the system during a multistage process.

The modifier(s) can be any co-surfactant which is capable of stabilizing the micelles by shielding the charged polar groups of surfactant molecules at the micellar surface. Short branched or straight-chain alcohols of less than 5 carbons are preferred modifiers because of their ability to penetrate the micellar surface. Examples of preferred alcohols are nBA and isobutyl alcohol (IBA). Other alcohols can be used as long as adverse interactions with the anionic surfactant and other constituents of the solution are minimized.

The amount of the surfactant system to be added should be sufficient to form micelles. The actual volume needed to begin formation of micelles, called the critical micelle concentration (CMC), can be determined by routine physical-chemical experiments such as surface tension measurement. As surfactant is added, surface tension decreases initially until a breakpoint (CMC), after which point the surface tension changes only slightly. In one embodiment, the CMC was less than 8% surfactant system in the total volume of a mixture as described in Example 1.

A separating agent is necessary to form the separate phases of surfactant system and excess water. Ordinarily, micelles in solution repel one another due to high surface charge density resulting from the ionic polar groups. Any agent which is capable of diminishing this surface charge density can be used, provided that it is not detrimental to the concentration of $D_2O$ in the micellar phase. Examples of these agents are inorganic salts such as sodium chloride, sodium carbonate, calcium chloride, paraffinic short-chain oils such as n-octane and n-decane, or combinations of salts and oils as detailed below.

By "providing a separating agent" is meant that the agent may already be naturally present in the water or it may be added. It is therefore not critical that the separating agent be added at any particular point in the process nor in any given sequence with other components of the process. For example, a saline solution such as sea water already contains at least some of the salts that may be added to fresh water or sea water to produce a brine of the desired concentration. Additional amounts of the agents can be added in subsequent steps to more closely control the characteristics of the phase separation.

Sodium chloride is a preferred salt because of its ready availability, but other inorganic salts can also be used. An inorganic salt reduces the micellar surface charge by providing counter ions to associate with the polar groups of the surfactant molecules. Salts also reduce surfactant solubility and hence increase the size of the micelles. As salt concentration increases, micelles will aggregate to form a flocculated phase. Because the density of the surfactant is higher than that of the salt solution, the flocculated phase will initially be below the excess water phase.

A small amount of short-chain paraffinic oils, generally from six to sixteen carbons in length, can be used in combination with the salt solution to float the flocculated micelles to the top of the solution. The amount of oil to be added is typically less than one percent of the volume of the solution, because excess amounts of oil will displace water from the micellar phase. The added oil is solubilized in the micelle and the swollen micelles become lighter than the salt water. This coacervation, the flotation as a result of the balance of surface forces and gravitational force, produces a micellar phase (coacervate) separated from the lower excess water phase. The short-chain paraffinic oils can also be used alone (without other separating agents such as salts) to produce the coacervate.

If a petroleum-based surfactant such as a petroleum sulfonate is used, some unsulfonated oil may also be present. This oil will, of course, decrease the amount of additional separating agent needed to produce the coacervate.

The micellar phase contains a structure of spherical micellar aggregates, termed super-micelles, with the gap between the simple micelles within a super-micelle estimated at less than 50 angstroms. This gap is variable depending on the salinity of the water as well as the amount and type of oil added. The tremendous surface area provided by these extremely small micelles at this gap creates favorable conditions for deuterium-hydrogen exchange. The micellar phase will contain a higher concentration of $D_2O$ than the original $D_2O$ concentration in water.

The Process:

This process typically uses a container made of any impermeable material. The container need not be sealed, but is preferably enclosed or covered to prevent the loss of any volatile components such as alcohols. The process is typically conducted at ambient pressure.

Temperatures are also generally ambient, (typically about 20°–25° C.). The process is necessarily conducted at temperatures at which the $H_2O$ is a liquid, but otherwise the temperatures can vary over a wide range. Fluctuations in temperature should be minimized because solubility and phase characteristics of the solution are temperature dependent. As will be seen, adjustments to the process are preferably made by varying other parameters and therefore temperature fluctuations of even several °C. may be ignored.

The sequence in which the components are brought together is not critical. Salts are typically added to water before the other components merely for ease of mixing, although they can also be added at a later time. Because the characteristics of the phase separation are determined partly by the relative amounts of the separating agent or surfactant system, adjustments by adding further amounts of one or more components can be made after the initial mixing of the components. This adjustment technique is explained in the following section.

Separation of the first phase from the second phase can be accomplished by any technique capable of substantially segregating the surfactant phase from the excess water phase. The coacervate or surfactant phase can be withdrawn from the container, but this method is less preferred because of the potential loss of material during the transfer. The excess water phase is typically drained from the container and discarded, leaving the $D_2O$-enriched surfactant phase. In a multi-stage process, fresh feed water is then introduced into the container holding the surfactant phase.

Process Adjustments:

At certain concentrations of components as exemplified below, the mixture will form a first phase containing a majority of the surfactant and a second phase containing the excess water. The coacervate will itself contain a large amount of water in the first stage of the separation. In order to maximize $D_2O$ yield in the separation process, both the amount of water in the coacervate and the volume of the excess water phase must be optimized by precise phase volume control. Four parameters which governed the volume of the coacervate in the examples shown were the concentrations of surfactant, alcohol, salt and oil.

The addition of modifiers or separating agents to decrease micellar solubility or surface charge density also causes a decrease in the percent volume of water in the coacervate phase. Preferably, one of the agents will be oil in an amount sufficient to induce a phase separation and produce a coacervate. The mixture is adjusted, preferably by the use of alcohol, until the coacervate contains a large volume percent of water, preferably 80 to 85% in the first separation stage. In one embodiment, the volume of the entire coacervate phase can be approximately equal to the volume of water in the excess water phase. Thus a preferred first stage separation consists of an excess water phase making up half of the volume and a coacervate phase containing 80–85% water. After the first stage separation reaches equilibrium, the two phases may be separated. The time needed to achieve separation equilibrium can vary, but 24 hours is typical for a mixture of about one liter in volume.

In a multistage process, the addition of surfactant beyond what is required for formation of the initial coacervate is generally unnecessary. Surfactant can be added, however, to replace any lost during transfer between containers or if the amount of surfactant present is insufficient to form micelles in the volume of feed water to be added.

The salinity of the feed water at any stage can also be adjusted to achieve more efficient coacervation, depending on the phase behavior of the previous stage. Alternatively, salt can be added directly to the coacervate-water mixture. If the coacervate phase volume is small in the previous stage, less salt should be added to the following stage. If the coacervate volume is large, more salt should be added.

Alcohol can be added to more precisely control the coacervation from stage to stage and is highly preferred because of its solubility in water. Oil is preferably added only to the first stage to insure micelle floatation (coacervation). Since the oil will not appreciably partition into the excess water phase, there is very little loss from one stage to the next. It is less preferred and generally unnecessary to add additional amounts of oil.

The following examples are illustrative of certain specific embodiments of the invention. However, these examples are for illustrative purposes only and should not be construed as limitations upon the invention.

SPECIFIC EMBODIMENTS

Example 1:

One part of 99.7 D-atom percent pure $D_2O$ obtained from the Aldrich Chemical Co. was mixed with 9 parts by volume of distilled water to form a 10% $D_2O$ solution. Sodium chloride was added to this mixture to make a 1% weight to volume solution, e.g. 1 g. NaCl in 100 ml $D_2O$-water solution. The anionic surfactant system was prepared by combining Aerosol OT ® (sodium-di-2-ethyl-hexyl-sulfosuccinate, an isomerically pure surfactant manufactured by American Cyanamid) with n-butyl alcohol (nBA) in a 1:3 weight to weight ratio, resulting in a clear solution.

The surfactant system was added to the prepared mixture of sodium chloride and $D_2O$ in water to form a 8% solution by volume. The solution was allowed to settle for about 24 hrs. A flocculated phase was observed at the bottom of the container. An additional separating agent, n-octane, was added in an amount equal to 0.2% by volume, and coacervation was observed. n-Octane was again added incrementally in amounts equal to 0.2%. Phase inversion of the coacervate, the replacement of the aqueous intermicellar fluid with oil, was detected at about 1.0% octane at which point the volume of the coacervate was about 10% of the total solution.

Samples of the coacervate and excess water phases were withdrawn at appropriate stages and analyzed by gas chromatographic mass spectroscopy (GCMS). Data from the samples were compared to standards containing known quantities of $D_2O$. The amount of $D_2O$ in both the coacervate and excess water phases could then be determined.

Several factors define the effectiveness of an enrichment process. The first of these is the effective separation factor, $\alpha$, which is calculated using the mole fraction x of $D_2O$ in the enriched (coacervate) or depleted (excess water) phases as follows:

$$\alpha = \frac{x/(1-x) \text{ enriched}}{x/(1-x) \text{ depleted}} = \frac{\text{moles } D_2O/\text{moles } H_2O \text{ enriched}}{\text{moles } D_2O/\text{moles } H_2O \text{ depleted}}$$

The moles of $D_2O$ in the final coacervate were calculated for the volume of water in that phase and the percentage of $D_2O$ from GCMS interpretation. The number of moles of $D_2O$ in the entire excess water phase is the difference between the moles in the total system and in the final coacervate phase. The moles of $H_2O$ in the enriched or depleted phases were similarly calculated.

The second factor used to compare the effectiveness of various separation processes is the enrichment factor, $\beta$.

$$\beta = \frac{\% \, D_2O \text{ in final stage coacervate}}{\% \, D_2O \text{ in feed water}}$$

This compares the concentration of $D_2O$ in the coacervate of the final stage with the concentration of $D_2O$ in the natural feeds.

A third factor is the efficiency of the process, $\gamma$, which is percent recovery of $D_2O$.

$$\gamma = \frac{\text{moles } D_2O \text{ in final coacervate}}{\text{moles } D_2O \text{ in total system}} \times 100$$

Data showing the physical characteristics of the system, deuterium enrichment and process efficiency are in Table I.

The first line of Table I is the control solution of 10% $D_2O$ in $H_2O$. The second line is the sample containing 0.2% n-octane, which shows an improvement in the H/D ratio to 81.4/18.6 compared to 89.45/10.55 of the control. Separation and enrichment factors are larger for the 0.2% n-octane solution than for solutions containing more n-octane, indicating that optimal separation of the heavy water was accomplished with the 0.2% n-octane concentration.

TABLE I

PHASE SEPARATION, H-D RATIO IN COACERVATE, AND PROCESS EFFICIENCY
Aerosol ® OT-100/nBA System

| % n-Octane | Coacervate Volume % | % Water In Coacervate | $H_2O/HDO/D_2O$ | H/D | Separation Factor, $\alpha$ | Enrichment Factor, $\beta$ | Percent $D_2O$ Recovery, $\gamma$ |
|---|---|---|---|---|---|---|---|
| 0 | (10% $D_2O$ in Water) | | 80.3/18.3/1.4 | 89.45/10.55 | — | — | — |
| 0.2 | 50 | 83.6 | 66.3/30.2/3.5 | 81.4/18.6 | 5.757 | 1.764 | 45.51 |
| 0.3 | 39 | 78.7 | 68.8/28.1/3.1 | 82.9/17.1 | 2.645 | 1.620 | 33.44 |

TABLE I-continued
PHASE SEPARATION, H-D RATIO IN COACERVATE, AND PROCESS EFFICIENCY
Aerosol® OT-100/nBA System

| % n-Octane | Coacervate Volume % | % Water In Coacervate | $H_2O/HDO/D_2O$ | H/D | Separation Factor, $\alpha$ | Enrichment Factor, $\beta$ | Percent $D_2O$ Recovery, $\gamma$ |
|---|---|---|---|---|---|---|---|
| 0.4 | 32 | 73.8 | 69.6/27.0/3.0 | 83.3/16.7 | 2.187 | 1.581 | 25.75 |
| 0.6 | 23 | 62.6 | 69.4/27.7/2.9 | 83.3/16.7 | 1.933 | 1.578 | 15.75 |
| 0.8 | 16 | 45.0 | 73.6/24.2/2.2 | 85.7/14.3 | 1.471 | 1.359 | 7.89 |
| 1 | 10 | 12.0 | | | | | |

Example 2:

A commercial petroleum sulfonate (TRS 10-80®), an anionic isomerically mixed surfactant manufactured by the Witco Chemical Company) and isobutanol (IBA) were mixed in equal parts by weight. A 10% $D_2O$-water mixture was separately prepared as in Example 1, except that sodium chloride was added to make a 3% saline solution. The surfactant system was mixed with the $D_2O$-saline to form an 8% by volume solution. n-Octane was then added incrementally in amounts equal to 0.4% of the entire mixture by volume. GCMS analyses of deuterium content are tabulated below.

Table II illustrates the effect of the addition of n-octane on the ratio of hydrogen to deuterium atoms in the coacervate compared to the ratio of H/D for a 10% mixture of $D_2O$ in water. As n-octane is added, it displaces water in the coacervate phase. The first sample, which contains the minimum amount of n-octane (0.4%) needed to induce coacervation in this mixture and the maximum amount of water in the coacervate phase, contained the combination of components that was most effective in separating heavy water in this example. In this system, water was the intermicellar fluid until about 2.0% octane, after which phase inversion to an oil-external micellar phase occurred.

tration of 0.4% oil. The coacervate phase decreased in volume rapidly as more oil molecules penetrated the surface of the micelles, displacing water and reducing the surface charge density.

Example 5:

A brine was prepared by dissolving 1% NaCl (weight to volume) in tap water. A surfactant system of Aerosol OT® and nBA was prepared as in Example 1. A mixture containing by volume 10% surfactant system, 0.1% n-octane and 89.9% brine was prepared in a 100 cc graduated cylinder and was allowed to stand for 24 hours after blending. In the first stage the phase volume of the coacervate was 51% of total, and the excess brine was 49%. The coacervate contained 86.5% water by volume.

The coacervate from the first stage was withdrawn and transferred to another container. To induce the second coacervation, 45 cc of fresh tap water, 1.0 cc of the surfactant system and 2.7 cc of additional nBA were added. The procedure was repeated for each stage using the same additional amount of surfactant system but varying the amount of alcohol. Water was added to each stage in an amount sufficient to bring the total volume to 100 cc. Data from each stage is shown in Table III. The analysis of the tenth stage coacervate

TABLE II
PHASE SEPARATION, H-D RATIO IN COACERVATE, AND PROCESS EFFICIENCY
Witco Surfactant TRS® 10-80/IBA System

| % n-Octane | Coacervate Volume % | % Water In Coacervate | $H_2O/HDO/D_2O$ | H/D | Separation Factor, $\alpha$ | Enrichment Factor, $\beta$ | Percent $D_2O$ Recovery, $\gamma$ |
|---|---|---|---|---|---|---|---|
| 0 | (10% $D_2O$ in Water) | | 80.30/18.30/1.40 | 89.45/10.55 | — | — | — |
| 0.4 | 29 | 77.55 | 70.77/26.68/2.55 | 84.10/15.90 | 1.910 | 1.51 | 33.9 |
| 0.8 | 17 | 52.88 | 69.99/27.45/2.56 | 83.72/16.28 | 1.753 | 1.54 | 13.8 |
| 1.2 | 13 | 32.15 | 73.45/24.48/2.06 | 85.71/14.29 | 1.438 | 1.35 | 5.7 |
| 1.6 | 11 | 14.09 | 75.84/22.59/1.57 | 88.68/11.32 | 1.083 | 1.08 | 1.7 |
| 2.0 | 10 | 11.1 | 76.54/22.04/1.42 | 88.97/11.03 | 1.052 | 1.05 | 1.2 |

Example 3:

To demonstrate that the salinity of the water can control coacervation and phase volume, the surfactant system components of Example 2, (TRS 10-80)® and IBA, were mixed in equal amounts by weight. This system was added to a previously prepared 3% weight to volume NaCl solution to produce an 8% by volume solution of the surfactant. The initial salinity of the solution was then increased by adding more sodium chloride. A flocculated phase was observed at a concentration of 3% NaCl, and this flocculated phase continued to decrease in volume until the concentration reached about 4.5% NaCl. At about 4.75% NaCl, coacervation occurred.

Example 4:

To demonstrate that oil can also control the coacervation process, the surfactant-alcohol system of Example 3 was prepared. NaCl was added to make a 2% solution and that concentration was maintained. n-Octane was added; coacervation occurred at a concenphase to determine deuterium content showed a separation factor of 6.05, enrichment factor of 3.91, and recovery of 42.95% as defined in Example 1.

TABLE III

| Stage | Coacervate Volume % of Total | Coacervate, % Water | Alcohol Added, cc |
|---|---|---|---|
| 1 | 51.0 | 86.47 | 0 |
| 2 | 52.0 | 79.85 | 2.70 |
| 3 | 56.2 | 75.21 | 2.40 |
| 4 | 60.0 | 71.15 | 2.25 |
| 5 | 63.0 | 67.56 | 2.05 |
| 6 | 67.0 | 65.00 | 1.85 |
| 7 | 68.0 | 62.82 | 1.65 |
| 8 | 71.0 | 60.73 | 1.40 |
| 9 | 75.0 | 59.63 | 1.20 |
| 10 | 77.0 | 57.82 | 1.00 |

I claim:

1. A process for separating $D_2O$ from solutions of $D_2O$ in $H_2O$, the process comprising:
   (i) adding an anionic surfactant system to a solution of $D_2O$ in $H_2O$ in an amount capable of forming micelles of the surfactant;
   (ii) providing a separating agent in the solution in an amount sufficient to form a flocculated micellar first phase containing a majority of the surfactant system with an increased concentration of $D_2O$ and a second phase containing excess water with a decreased concentration of $D_2O$;
   (iii) separating the first phase from the second phase;
   (iv) introducing an additional solution of $D_2O$ in $H_2O$ to the first phase; and
   (v) repeating steps (i)-(iii) to separate said $D_2O$ from said additional solution.

2. The process of claim 1 in which the separating agent comprises at least one of an inorganic salt and a paraffinic oil of from 6 to 16 carbons.

3. The process of claim 2 in which the separating agent comprises a combination of at least one salt and at least one oil.

4. The process of claim 3 in which the salt is sodium chloride and the oil is n-octane.

5. The process of claim 4 in which the solution of $D_2O$ in $H_2O$ is a 10% by volume mixture of $D_2O$ in distilled water.

6. The process of claim 4 in which the solution of $D_2O$ in $H_2O$ is natural water.

7. The process of claim 4 in which the solution of $D_2O$ in $H_2O$ is sea water.

8. The process of claim 5 in which the anionic surfactant system comprises a petroleum sulfonate and isobutyl alcohol.

9. The process of claim 5 or 6 in which the anionic surfactant system comprises sodium-di-2-ethylhexyl-sulfosuccinate and n-butyl alcohol.

* * * * *